United States Patent
Akasaka

(10) Patent No.: US 12,519,280 B2
(45) Date of Patent: Jan. 6, 2026

(54) PHOSPHOROUS DOPED FIBER-BASED RAMAN AMPLIFIER

(71) Applicant: FUJITSU LIMITED, Kawasaki (JP)

(72) Inventor: Youichi Akasaka, Plano, TX (US)

(73) Assignee: 1FINITY Inc., Kawasaki (JP)

( * ) Notice: Subject to any disclaimer, the term of this patent is extended or adjusted under 35 U.S.C. 154(b) by 1101 days.

(21) Appl. No.: 17/517,509

(22) Filed: Nov. 2, 2021

(65) Prior Publication Data

US 2023/0139856 A1    May 4, 2023

(51) Int. Cl.
| | |
|---|---|
| H01S 3/30 | (2006.01) |
| H01S 3/067 | (2006.01) |
| H01S 3/0915 | (2006.01) |
| H01S 3/094 | (2006.01) |
| H01S 3/16 | (2006.01) |
| H01S 3/17 | (2006.01) |
| H04B 10/291 | (2013.01) |

(52) U.S. Cl.
CPC .......... *H01S 3/302* (2013.01); *H01S 3/06716* (2013.01); *H01S 3/0915* (2013.01); *H01S 3/094096* (2013.01); *H01S 3/175* (2013.01); *H01S 3/06762* (2013.01); *H01S 3/1608* (2013.01); *H04B 10/2916* (2013.01)

(58) Field of Classification Search
None
See application file for complete search history.

(56) References Cited

U.S. PATENT DOCUMENTS

| | | | | |
|---|---|---|---|---|
| 5,905,838 A | * | 5/1999 | Judy ................. | G02B 6/03644 385/100 |
| 6,307,668 B1 | * | 10/2001 | Bastien ............... | H01S 3/06754 359/341.5 |
| 7,008,892 B2 | * | 3/2006 | Bourova ................. | C03C 4/00 359/334 |
| 7,463,411 B2 | * | 12/2008 | Demidov ........... | H04B 10/2916 359/341.1 |
| 2005/0232559 A1 | * | 10/2005 | Akasaka ............ | H04B 10/2916 385/142 |

* cited by examiner

*Primary Examiner* — Eric L Bolda
(74) *Attorney, Agent, or Firm* — Maschoff Brennan

(57) ABSTRACT

According to an aspect of an embodiment, an optical amplification system may include a broadband pump source and an optical fiber doped with phosphorus. The broadband pump source may be configured to generate a pumping beam. The pumping beam may include a pumping wavelength range between 1330 nm and 1400 nm. The optical fiber may be configured to receive the pumping beam and an input optical signal. The input optical signal may include a first component that may correspond to a first wavelength range and a second component that may correspond to a second wavelength range. The pumping beam may cause Raman amplification to the first component and the pumping beam may cause Raman amplification to the second component. The amplification of the first component and the second component by the pumping beam may produce an amplified optical signal.

16 Claims, 5 Drawing Sheets

PHOSPHOROUS DOPED FIBER-BASED RAMAN AMPLIFIER

FIELD

The embodiments discussed in the present disclosure are related to a phosphorus doped fiber-based Raman amplifiers.

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. Further, optical pumping may be used to amplify optical signals that propagate through optical networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an optical amplification system may include a broadband pump source and an optical fiber doped with phosphorus. The broadband pump source may be configured to generate a pumping beam. The pumping beam may include a pumping wavelength range of 1330 nm to 1400 nm. The optical fiber may be configured to receive the pumping beam and an input optical signal. The input optical signal may include a first component that may correspond to a first wavelength range and a second component that may correspond to a second wavelength range. The pumping beam may cause Raman amplification to the first component and the pumping beam may cause Raman amplification to the second component. The amplification of the first component and the second component by the pumping beam may produce an amplified optical signal.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
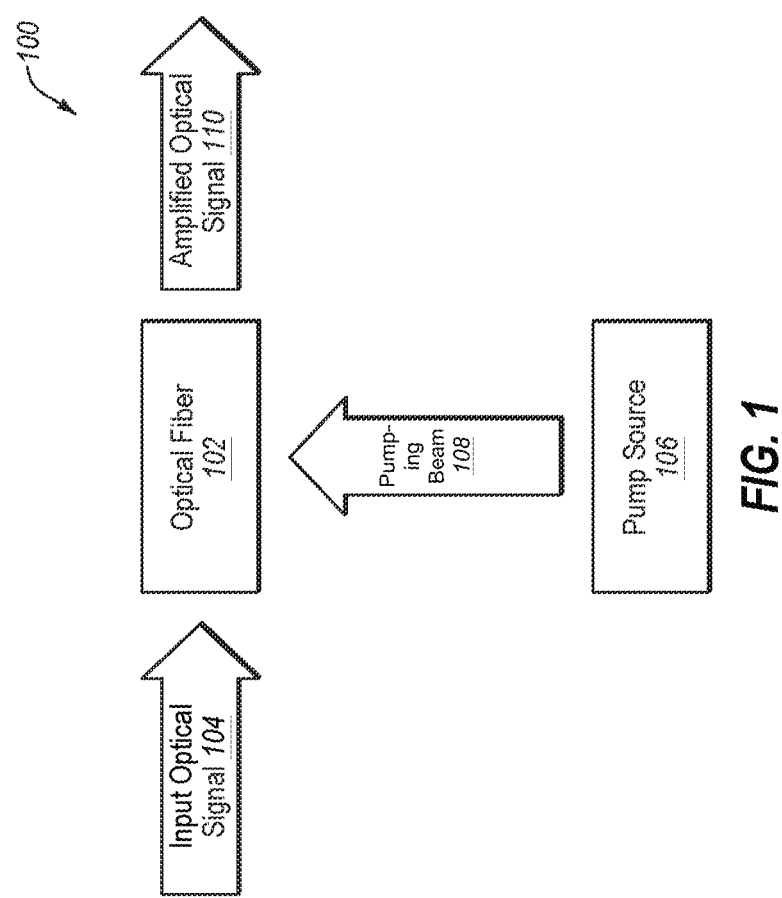
FIG. 1 illustrates an example embodiment of an optical amplification system configured to perform pumping of optical signals.

Optical networks may include nodes that may be configured to communicate information to each other via optical signals carried by optical fibers. In some circumstances, amplification of the optical signals within the optical fibers may enable the optical signals to travel a greater distance by compensating for losses that may affect the optical signal, such as degradations of the optical signal due to a noisy channel within the optical networks. In some circumstances, additional bandwidth for optical signals may improve the amount of data that may be transmitted by the optical networks. For example, optical networks configured to transmit and/or amplify many optical signals with varying wavelengths may be configured to increase data throughput by transmitting more data in parallel through the optical network. In such circumstances, optical signals having different wavelengths may be combined and sent through an optical network and may be separated once received which may improve the amount of data transmitted in the optical network.

Amplification of optical signals within an optical network may be obtained by optical pumping, which may be performed by an optical amplifier. In some circumstances, an optical amplifier may be suited to produce a linear amplification of signals by an energy transfer of stimulation ions within an optical fiber. Alternatively or additionally, an optical amplifier configured to produce Raman gain (referred to as a "Raman amplifier") may be suited to produce nonlinear amplification of signals by energy transfer of bonded elements within an optical fiber. In these or other instances, the optical amplifiers may be better suited for amplification of certain wavelengths than other wavelengths. For example, erbium doped fiber amplifiers (EDFAs) may provide a certain amount of amplification with respect to wavelengths that are within approximately 1525 nm to 1565 nm and/or 1565 nm to 1610 nm, which may be commonly referred to as the C-band and L-band, respectively, of optical communications. As such, EDFAs may be fairly well suited to amplify optical signals within such bands. In some circumstances, optical pumping, including EDFAs, may include a narrowband pump source that may be configured to excite ions within the amplifier, such as erbium ions within an EDFA. However, in some circumstances, the gains that may be realized by using an EDFA may be limited to a single gain region.

For example, a gain region may include an amplification range of optical signals whose wavelength ranges are located within a particular wavelength band, such as the C-band or the L-band. Alternatively or additionally, amplification outside the gain region may still occur, but may include narrow gains such that only a narrow wavelength range of optical signals may be amplified outside the gain region, which may be less beneficial than a gain region configured to amplify more wavelength ranges. In some circumstances, optical amplifiers, including EDFAs, may not be well suited for amplification of optical signals having wavelength ranges outside the C-band and/or the L-band.

For example, an EDFA may not be well suited to amplify optical signals having a wavelength range of approximately 1410 nm to 1500 nm and/or 1610 nm to 1720 nm, which may be commonly referred to as the S-band and U-band, respectively, of optical communications. In general, current optical amplifiers, including but not limited to EDFAs, may not be well suited to amplify optical signals included in the S-band and/or U-band.

According to one or more embodiments of the present disclosure, a Raman amplifier may be configured to amplify optical signals using a broadband pump source. Further, the Raman amplifier may be configured to amplify optical signals having wavelength ranges within the S-band and/or the U-band. In some embodiments, the Raman amplifier may include an optical fiber doped with phosphorus. In these and other embodiments, the combination of the broadband pump source and the phosphorus doped optical fiber may be configured to amplify optical signals in more than one wavelength range. For example, the broadband pump source may be configured to cause vibrations to bonded phosphorus compounds within the optical fiber doped with phosphorus such that optical signals may be amplified in the S-band and/or the U-band. For example, the phosphorus elements within the optical fiber may combine with oxygen elements to form a single covalent bond or a double covalent bond. The single and/or double covalent bonded phosphorus compounds may be configured to absorb energy from the broadband pump source by vibration and may be configured to transfer the absorbed energy to an optical signal for amplification thereof. For example, an energized single covalent bonded phosphorus compound may transfer energy to an optical signal with a wavelength range within the S-band and an energized double covalent bonded phosphorus compound may transfer energy to an optical signal with a wavelength range within the U-band. As such, an optical system including a broadband pump source and a phosphorus doped optical fiber may be configured to amplify optical signals having wavelength ranges that were previously difficult or impractical to amplify, due to limitations of existing optical amplifiers, including EDFAs.

Embodiments of the present disclosure will be explained with reference to the accompanying drawings.

FIG. 1 illustrates an example embodiment of an optical amplification system 100 configured to perform pumping of optical signals, in accordance with at least one embodiment of the present disclosure. The optical amplification system 100 may include an optical fiber 102, and a pump source 106.

In general, the optical amplification system 100 may be configured to generate a pumping beam 108 that may amplify an input optical signal 104 to generate an amplified optical signal 110. In some embodiments, the optical amplification system 100 may be included in any suitable optical device. For example, the optical amplification system 100 may be included in any suitable Raman amplifier configured to apply a Raman amplification to an optical signal.

The input optical signal 104 may include any optical signal configured to carry data. For example, the input optical signal 104 may include an optical signal generated by a light emitting diode (LED), a laser such as a laser diode, having data modulated thereon and/or other similar optical signals. In some embodiments, the input optical signal 104 may be generated by a transmitting source, such as an optical transmitter, configured to convey data and/or information over an optical network.

In some embodiments, the input optical signal 104 may include a wavelength division multiplexing (WDM) signal that may include multiple beams that each correspond to different wavelength ranges. For example, the input optical signal 104 may include multiple wavelength ranges where each wavelength range may or may not be amplified by a pumping beam, such as the pumping beam 108. For example, the input optical signal 104 may include a first wavelength range, a second wavelength range, and a third wavelength range where the first and third wavelength ranges may be amplified by a pumping beam within an optical fiber and the second wavelength range may not. In some embodiments, the input optical signal 104, which may include multiple wavelength ranges, may be amplified by the pumping beam in instances in which the wavelength range of the optical signal differs from the wavelength range of the pumping beam. Referring to the previous example, the first wavelength range and the third wavelength range may be amplified by the pumping beam as the pumping beam wavelength range may be less than the first wavelength range and the third wavelength range. The second wavelength range may not be amplified by the pumping beam as the second wavelength range may be the same or similar as the pumping beam wavelength range. In these and other embodiments, the interaction between the pumping beam 108 and the input optical signal 104 within the optical fiber 102 may produce the amplified optical signal 110, as described below.

In some embodiments, the pump source 106 may include a light source generator that may be configured to produce the pumping beam 108. For example, the pump source 106 may include a laser device that may be configured to produce and/or output a pumping beam, such as the pumping beam 108. In some embodiments, the pump source 106 may include a broadband laser such that the pumping beam 108 may include a broad range of wavelengths. For example, the pump source 106 may be configured to generate a light beam having a wavelength range between approximately 1330 nm and 1400 nm such that the pumping beam 108 may include a pumping wavelength range between approximately 1330 nm and 1400 nm. In some embodiments, the pump source 106 may be configured to produce the pumping beam 108 as an incoherent pumping beam. For example, the pump source 106 may produce an incoherent, broadband pumping beam that may be the pumping beam 108 of the optical amplification system 100. An incoherent pumping beam may include a pumping beam whose photons include different frequencies and limitedly interfere with one another and/or whose wavelengths are out of phase with each other, such that the pumping beam is diffuse. In these and other embodiments, the pumping beam 108 may be a high-power pumping beam. For example, the pumping beam 108 may include a power of at least 20 decibel-milliwatts (dBm).

In some embodiments, the optical fiber 102 may include an optical medium such as glass. For example, the optical fiber 102 may include a glass medium comprised of silica. Alternatively or additionally, the optical fiber 102 may include any medium suitable for optical transmission, which may include fluorozirconate glass, fluoroaluminate glass, chalcogenide glass, crystalline materials, and/or other mediums that may be suitable for optical transmissions. In some embodiments, the optical fiber 102 may be doped with phosphorus such that the optical fiber 102 may include a silicate doped with phosphorus. In some embodiments, the phosphorus may covalently bond with oxygen in the silicate. In some embodiments, the phosphorus may be bonded with the oxygen via a single covalent bond. Alternatively or additionally, the phosphorus may be bonded with the oxygen via a double covalent bond. In these and other embodiments, the phosphorus-oxygen compounds (e.g., the single covalent bond and/or the double covalent bond) may absorb energy from the pumping beam 108. For example, the phosphorus-oxygen compounds may absorb energy from the pumping beam 108 through a transfer of energy via vibration.

In some embodiments, certain wavelengths of light may be configured to energize the phosphorus-oxygen compounds. For example, the pumping beam 108 may include wavelength ranges of approximately 1330 nm to 1400 nm that may energize the phosphorus-oxygen compounds. Alternatively or additionally, the energized phosphorus-oxygen compounds may amplify an optical signal within one or more wavelength ranges, such as the S-band (e.g., approximately 1410 nm to 1500 nm) and/or the U-band (e.g., approximately 1610 nm to 1720 nm). For example, a pumping beam 108 having a wavelength range of approximately 1330 nm to 1400 nm may energize single covalent bonded phosphorus and oxygen compounds to generate gain with a wavelength range of approximately 1410 nm to 1500 nm (S-band) and may energize double covalent bonded phosphorus and oxygen compounds to generate gain with a wavelength range of approximately 1610 nm to 1720 nm (U-band). In instances in which the optical fiber 102 is doped with phosphorus, the phosphorus-oxygen compounds may be energized by the pumping beam 108 in which the energized phosphorus-oxygen compounds may provide amplification of the input optical signal 104.

In some embodiments, the optical fiber 102 may be configured to receive the input optical signal 104 and the pumping beam 108. In some embodiments, the pumping beam 108 may include wavelength ranges that may stimulate ions and/or energize compounds of a dopant disposed within the optical fiber 102. For example, in instances in which the optical fiber 102 is doped with phosphorus, the pumping beam 108 may include wavelength ranges that may be configured to energize the phosphorus-oxygen compounds within the optical fiber 102. The energized phosphorus-oxygen compounds may interact with the input optical signal 104 such that energy may be transferred to the input optical signal 104 while the input optical signal 104 traverses the optical fiber 102. For example, the input optical signal 104 may include wavelength ranges that may be amplified by the energized phosphorus-oxygen compounds, such that the input optical signal 104 may be amplified within the optical fiber 102.

In some embodiments, the optical fiber 102 may be configured to output the amplified optical signal 110. For example, after obtaining the input optical signal 104 and the pumping beam 108, the optical fiber 102 may support an energy transfer to the input optical signal 104 which may cause the optical fiber 102 to output the amplified optical signal 110.

In some embodiments, the optical amplification system 100 may be employed as a Raman amplifier for communications including optical signals with wavelengths of approximately 1410 nm to 1500 nm, which may be commonly referred to as the S-band. For example, the input optical signal 104 may be included in the S-band wavelength range, where the input optical signal 104 within the S-band may be configured to be amplified by energized phosphorus-oxygen compounds having a single covalent bond, within the optical fiber 102. Alternatively or additionally, the optical amplification system 100 may be employed as a Raman amplifier for communications including optical signals with wavelengths of approximately 1610 nm to 1720 nm, which may be commonly referred to as the U-band. For example, the input optical signal 104 may be included in the U-band wavelength range, where the input optical signal 104 within the U-band may be configured to be amplified by energized phosphorus-oxygen compounds having a double covalent bond, within the optical fiber 102.

In some embodiments, the optical amplification system 100 may be configured to produce a Raman amplification. For example, the input optical signal 104 may include a wavelength that may be greater than a wavelength of the pumping beam 108 such that stimulated Raman scattering produced by molecule scattering from the pumping beam 108 may amplify the input optical signal 104. Alternatively or additionally, the Raman amplification may include distributed Raman amplification. For example, the pumping beam 108 may be distributed within the transmission fiber, including the optical fiber 102, such that the input optical signal 104 may be amplified as the input optical signal 104 traverses the transmission fiber. In these and other embodiments, the Raman amplification of the optical amplification system 100 may be nonlinear. For example, the amount of gain realized in the optical amplification system 100 may not be linearly correlated with the amount of energy contributed to the optical amplification system 100 by the pumping beam 108.

Modifications, additions, or omissions may be made to the optical amplification system 100 without departing from the scope of the present disclosure. For example, in some embodiments, the optical amplification system 100 may include any number of other components that may not be explicitly illustrated or described.

Figure 2:
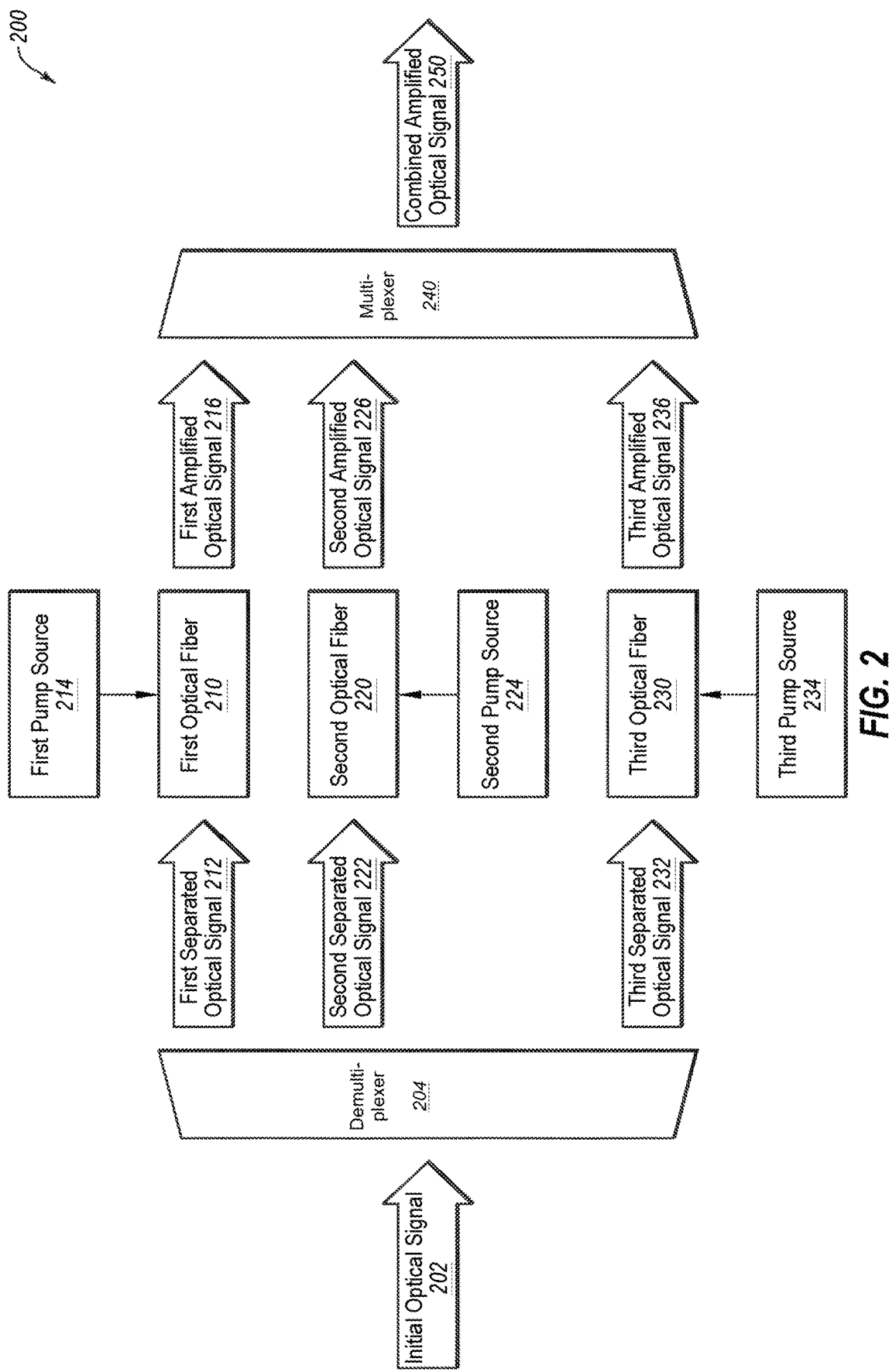
FIG. 2 illustrates an example embodiment of an optical amplification system configured to perform pumping of an optical signal including multiple wavelength ranges.

FIG. 2 illustrates an example optical amplification system 200 configured to perform pumping of an optical signal including multiple wavelength ranges, in accordance with at least one embodiment of the present disclosure. The optical amplification system 200 may include a demultiplexer 204, a first optical fiber 210, a first pump source 214, a second optical fiber 220, a second pump source 224, a third optical fiber 230, a third pump source 234, and a multiplexer 240.

In general, the optical amplification system 200 may be similar to the optical amplification system 100, in that the optical amplification system 200 may be configured to generate one or more pumping beams that may amplify an initial optical signal 202 to generate a combined amplified optical signal 250. In some embodiments, the initial optical signal 202 may be separated into a first separated optical signal 212, a second separated optical signal 222, and a third separated optical signal 232. In some embodiments, the first separated optical signal 212, the second separated optical signal 222, and the third separated optical signal 232 may be amplified within the first optical fiber 210, the second optical fiber 220, and the third optical fiber 230 to generate a first amplified optical signal 216, a second amplified optical signal 226, and a third amplified optical signal 236, respectively. Further, the first amplified optical signal 216, the second amplified optical signal 226, and the third amplified optical signal 236 may be combined into a combined amplified optical signal 250, as described herein. In some embodiments, the optical amplification system 200 may be included in any suitable optical device. For example, the optical amplification system 200 may be included in any suitable optical and/or Raman amplifier configured to apply a gain, including a Raman amplification, to an optical signal.

In some embodiments, the initial optical signal 202 may be the same or similar to the input optical signal 104 of FIG. 1. Alternatively or additionally, the initial optical signal 202 may include an optical signal including at least two different wavelength ranges that may be separable from one another. For example, in instances in which the initial optical signal 202 includes three wavelength ranges, the initial optical signal 202 may be separated into three signals where each separated signal includes a wavelength range different from the other separated signals of the initial optical signal 202. In some embodiments, the initial optical signal 202 may include a WDM signal that may include multiple beams that each correspond to different wavelength ranges.

In some embodiments, the demultiplexer 204 may include any device configured to separate an optical signal into multiple optical signals, such as the first separated optical signal 212, the second separated optical signal 222, and the third separated optical signal 232. In some embodiments, each separated optical signal may include a different wavelength range from other separated optical signals. For example, in instances in which the initial optical signal 202 includes three wavelength ranges and is input into the demultiplexer 204, the demultiplexer 204 may be configured to separate the initial optical signal 202 into the first separated optical signal 212, the second separated optical signal 222, and the third separated optical signal 232. The demultiplexer 204 may be configured to convert an input optical signal into more or less than three separated optical signals, as three separated optical signals are provided for illustrative purposes only.

In some embodiments, the first separated optical signal 212, the second separated optical signal 222, and the third separated optical signal 232 output from the demultiplexer 204 may be transmitted to an optical fiber, such as the first optical fiber 210, the second optical fiber 220, and the third optical fiber 230, respectively. For example, the first separated optical signal 212 including a first wavelength range may be transmitted to the first optical fiber 210, the second separated optical signal 222 including a second wavelength range may be transmitted to the second optical fiber 220, and the third separated optical signal 232 including a third wavelength range may be transmitted to the third optical fiber 230. In some embodiments, a separated optical signal output from the demultiplexer 204 may include more than one wavelength range. Referring back to the previous example, the first separated optical signal 212 may include a first wavelength range and a fourth wavelength range.

In some embodiments, some of the elements of the optical amplification system 200 may be analogous to the elements of the optical amplification system 100. For example, the first optical fiber 210 may be analogous to the optical fiber 102, the first separated optical signal 212 may be analogous to the input optical signal 104, the first pump source 214 may be analogous to the pump source 106, and/or the first amplified optical signal 216 may be analogous to the amplified optical signal 110.

As such, the first optical fiber 210 may include a silicate that may be doped with phosphorus. Alternatively or additionally, the first pump source 214 may include a light source configured to generate a pumping beam. The output from the first pump source 214 may include a broadband, incoherent pumping beam that may include a pumping wavelength range between approximately 1330 nm and 1400 nm. Alternatively or additionally, the pumping beam may be a high-power pumping beam that may include a power of at least 20 dBm.

Alternatively or additionally, the first separated optical signal 212 may include one or more wavelength ranges that may have been included in the initial optical signal 202, described above as the first wavelength range and the fourth wavelength range. For example, the first separated optical signal 212 may include the first wavelength range of approximately 1410 nm to 1500 nm and/or the fourth wavelength range of approximately 1610 nm to 1720 nm, which first wavelength range may be commonly referred to as the S-band and the fourth wavelength range may be commonly referred to as the U-band. For example, the first separated optical signal 212 may include the first wavelength range between approximately 1410 nm and 1500 nm and/or the fourth wavelength range between approximately 1610 nm and 1720 nm, which may correspond to the S-band and U-band wavelength ranges, respectively.

In these and other embodiments, a pumping beam from the first pump source 214 may be configured to energize phosphorus-oxygen compounds within the first optical fiber 210, which may interact with and/or amplify the first separated optical signal 212 to produce the first amplified optical signal 216.

In some embodiments, the second separated optical signal 222 may include one or more wavelength ranges that may have been included in the initial optical signal 202, described above as the second wavelength range. For example, the second separated optical signal 222 may include the second wavelength range of approximately 1525 nm to 1565 nm, that may be commonly referred to as the C-band.

In some embodiments, the second pump source 224 may include a light source generator that may be configured to produce a pumping beam. For example, the second pump source 224 may include a laser device that may be configured to produce and/or output a pumping beam. In some embodiments, the second pump source 224 may include a narrowband laser that may be configured to produce a pumping beam that may be at or near a wavelength range. For example, the second pump source 224 may be configured to output a pumping beam that may include a pumping wavelength of approximately 980 nm. Alternatively or additionally, the second pump source 224 may be configured to output a pumping beam that may include a pumping wavelength of approximately 1480 nm.

In some embodiments, the second optical fiber 220 may include an optical medium such as glass. For example, the second optical fiber 220 may include a glass medium comprised of silica. Alternatively or additionally, the second optical fiber 220 may include any medium suitable for optical transmission, which may include fluorozirconate glass, fluoroaluminate glass, chalcogenide glass, crystalline materials, and/or other mediums that may be suitable for optical transmissions. In some embodiments, the second optical fiber 220 may include a germanium dopant which may improve the refractive properties of the second optical fiber 220. Alternatively or additionally, the second optical fiber 220 may be doped with erbium such that the second optical fiber 220 may include a germanium silicate doped with erbium. In instances in which the second optical fiber 220 is doped with erbium, the erbium ions may be stimulated by the pumping beam from the second pump source 224 which stimulated erbium ions may be used in the amplification of the second separated optical signal 222.

In some embodiments, the second optical fiber 220 may be configured to receive the second separated optical signal 222 and a pumping beam from the second pump source 224. In some embodiments, the pumping beam may be configured to stimulate ions of a dopant disposed within the second optical fiber 220. For example, in instances in which the second optical fiber 220 is doped with erbium, the pumping beam may be configured to excite the erbium ions within the second optical fiber 220. The excited erbium ions may interact with the second separated optical signal 222 such that energy may be transferred to the second separated optical signal 222 while the second separated optical signal 222 traverses the second optical fiber 220.

In some embodiments, the second optical fiber 220 may be configured to output the second amplified optical signal 226. For example, after obtaining the second separated optical signal 222 and the pumping beam from the second pump source 224, the second optical fiber 220 may support an energy transfer to the second separated optical signal 222 which may cause the second optical fiber 220 to output the second amplified optical signal 226.

In some embodiments, the third separated optical signal 232 may include one or more wavelength ranges that may have been included in the initial optical signal 202, described above as the third wavelength range. For example, the third separated optical signal 232 may include the third wavelength range of approximately 1565 nm to 1610 nm, that may be commonly referred to as the L-band.

In some embodiments, the third pump source 234 may include a light source generator that may be configured to produce a pumping beam. For example, the third pump source 234 may include a laser device that may be configured to produce and/or output a pumping beam. In some embodiments, the third pump source 234 may include a narrowband laser that may be configured to produce a pumping beam that may be at or near a wavelength range. For example, the third pump source 234 may be configured to output a pumping beam that may include a pumping wavelength of approximately 1480 nm. Alternatively or additionally, the third pump source 234 may be configured to output a pumping beam that may include a pumping wavelength of approximately 980 nm.

In some embodiments, the third optical fiber 230 may include the same or similar properties to the second optical fiber 220. For example, the third optical fiber 230 may include a silica-based glass medium that may be doped with germanium and/or erbium such that the third optical fiber 230 may include a germanium silicate doped with erbium. Alternatively or additionally, the third optical fiber 230 may include any other optical medium suitable for transmitting an optical signal and may be doped with erbium.

In some embodiments, the third optical fiber 230 may be configured to receive the third separated optical signal 232 and a pumping beam from the third pump source 234. In some embodiments, the pumping beam may be configured to stimulate ions of a dopant disposed within the third optical fiber 230. For example, in instances in which the third optical fiber 230 is doped with erbium, the pumping beam may be configured to excite the erbium ions within the third optical fiber 230. The excited erbium ions may interact with the third separated optical signal 232 such that energy may be transferred to the third separated optical signal 232 while the third separated optical signal 232 traverses the third optical fiber 230.

In some embodiments, the third optical fiber 230 may be configured to output the third amplified optical signal 236. For example, after obtaining the third separated optical signal 232 and the pumping beam from the third pump source 234, the third optical fiber 230 may support an energy transfer to the third separated optical signal 232 which may cause the third optical fiber 230 to output the third amplified optical signal 236.

In some embodiments, the multiplexer 240 may include any device configured to combine multiple optical signals into a single optical signal. For example, the multiplexer 240 may be configured to obtain the first amplified optical signal 216, the second amplified optical signal 226, and the third amplified optical signal 236, and may be configured to combine the three optical signals into the combined amplified optical signal 250. The multiplexer 240 may be configured to convert more or less than three separated optical signals into a signal optical signal, as three separated optical signals are provided for illustrative purposes only. In these and other embodiments, the combined amplified optical signal 250 output from the multiplexer 240 may include the amplified initial optical signal 202, having been amplified by one or more components as described above.

Modifications, additions, or omissions may be made to the optical amplification system 200 without departing from the scope of the present disclosure. For example, in some embodiments, the second optical fiber 220 and the third optical fiber 230 may be combined into a single optical fiber. Further, in some embodiments, the second pump source 224 and the third pump source 234 may be combined and configured to produce a WDM pumping beam where each pumping beam of the WDM pumping beam may be configured to interact with a signal having different wavelength ranges. Alternatively or additionally, the optical amplification system 200 may include any number of other components that may not be explicitly illustrated or described.

Figure 3:
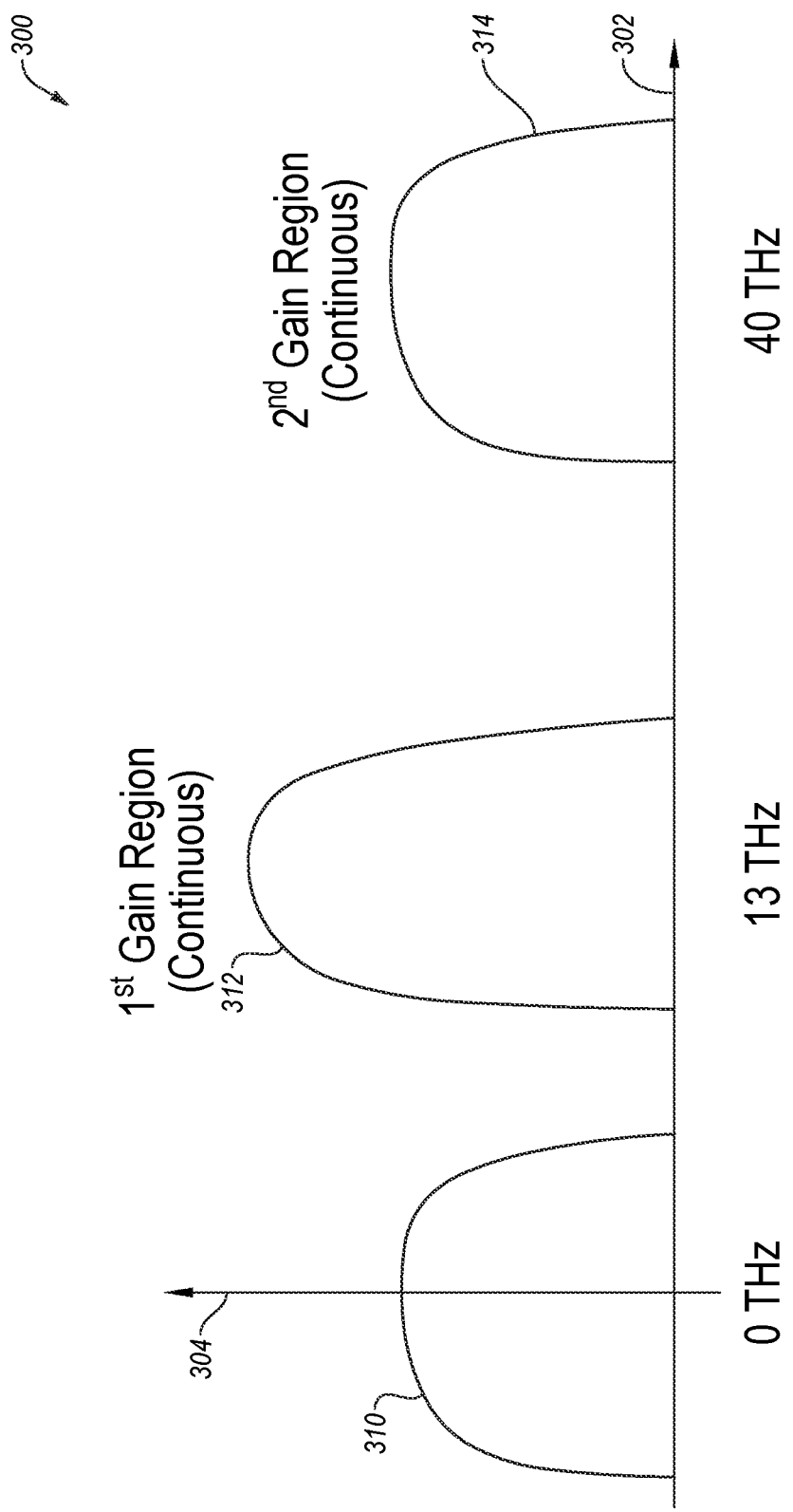
FIG. 3 illustrates an example graph of gain regions of an optical amplification system using a broadband pump source.

FIG. 3 illustrates an example graph 300 of gain regions of an optical amplification system using a broadband pump source, in accordance with at least one embodiment of the present disclosure. The graph 300 may include a frequency offset axis 302, a gain axis 304, a broadband pump bandwidth 310, a first gain region 312, and a second gain region 314.

In general, the graph 300 may illustrate the ranges of amplification that may occur in an optical amplification system. For example, the graph 300 may illustrate amplification that may occur in the optical amplification system 100 where the optical fiber may include a phosphorus dopant and the pump source may include a broadband, incoherent pump.

In some embodiments, the gain axis 304 may be illustrative only and may not provide discrete values of gain that may be experienced relative to a broadband pump source. For example, the gain axis 304 may provide illustrative context as to a relationship between the first gain region 312 and the second gain region 314, such as the first gain region 312 may experience an increased gain compared to the second gain region 314.

In some embodiments, the broadband pump bandwidth 310 may provide a representation of the wavelength range of a broadband pump, located at the origin of the graph 300. For example, the broadband pump bandwidth 310 may be centered on the frequency offset axis 302 such that there may be no offset in the representation of the broadband pump bandwidth 310. In some embodiments, the broadband pump bandwidth 310 may correspond to a broadband pump source, such as the pump source 106 of FIG. 1. For example, the broadband pump bandwidth 310 having a wavelength range of approximately 1330 nm to 1400 nm, may include a center of the broadband pump bandwidth 310 of approximately 1365 nm or 219.628 THz. In some embodiments, the frequency offset axis 302 may be illustrative in displaying frequency offsets (e.g., wavelength ranges) between the broadband pump bandwidth 310, the first gain region 312, and/or the second gain region 314. For example, the wavelength ranges of the broadband pump bandwidth 310, the first gain region 312, and the second gain region 314 may be illustrative and/or not to scale.

In some embodiments, the first gain region 312 may be offset from the broadband pump bandwidth 310 by approximately 13 THz, which may be equivalent to approximately a 100 nm wavelength offset. In instances in which the graph 300 is associated with a phosphorus doped optical amplification system, the first gain region 312 may be associated with amplification of optical signals having wavelength ranges in the S-band. In instances in which the center of the broadband pump bandwidth 310 is approximately 219.628 THz (from the example above), the center of the first gain region 312 may be offset by 13 THz, which may be approximately 206.628 THz, or 1450.9 nm.

In some embodiments, the second gain region 314 may be offset from the broadband pump bandwidth 310 by approximately 40 THz, which may be equivalent to approximately a 300 nm wavelength offset. In instances in which the graph 300 is associated with a phosphorus doped optical amplification system, the second gain region 314 may be associated with amplification of optical signals having wavelength ranges in the U-band. In instances in which the center of the broadband pump bandwidth 310 is approximately 219.628 THz (from the example above), the center of the second gain region 314 may be offset by 40 THz, which may be approximately 179.628 THz, or 1668.9 nm.

Modifications, additions, or omissions may be made to the graph 300 without departing from the scope of the present disclosure. For example, in some embodiments, the graph 300 may include various sizes, scales, or other graphical representations that may not be explicitly illustrated or described.

Figure 4:
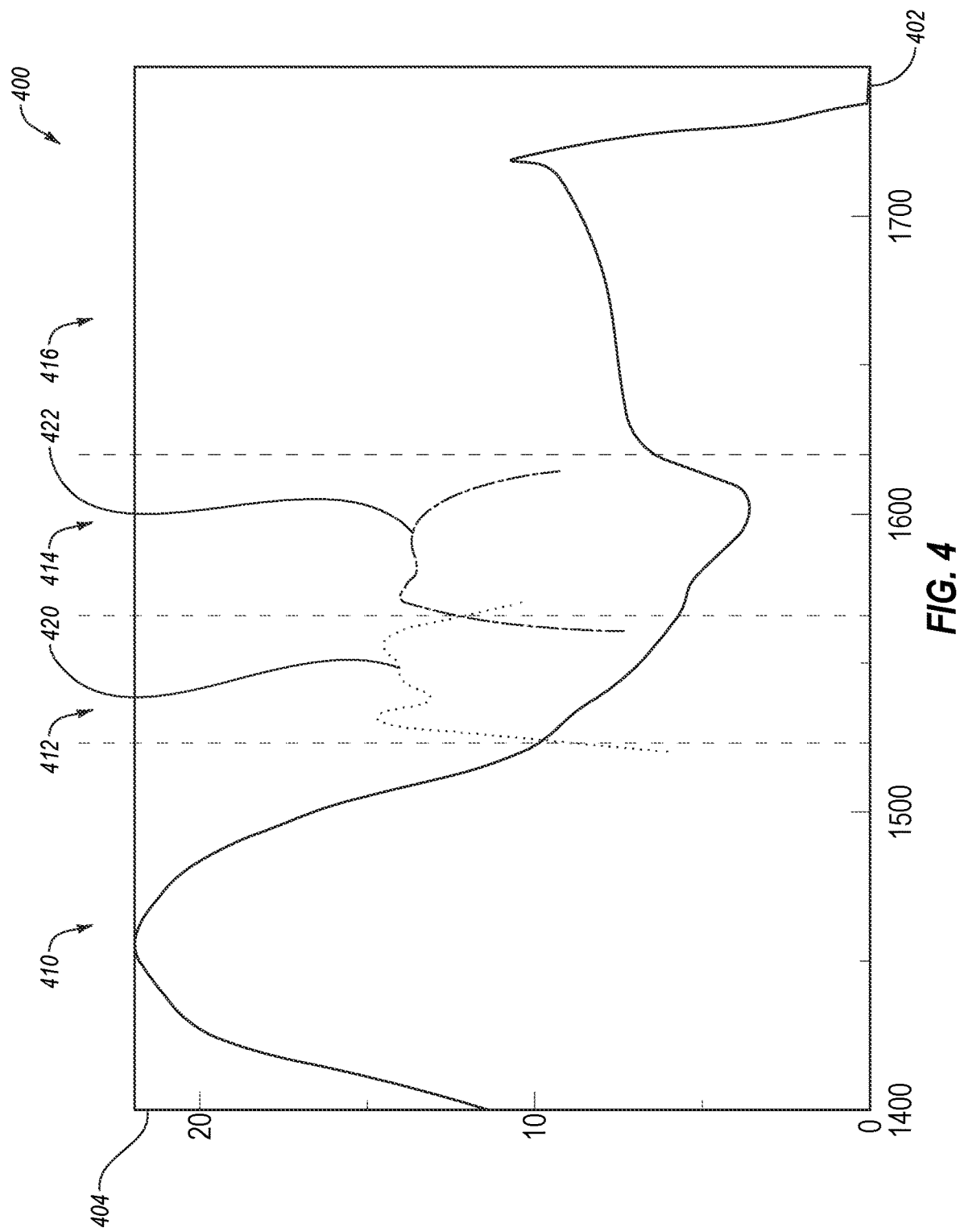
FIG. 4 illustrates an example graph of gain regions of an optical amplification system.

FIG. 4 illustrates an example graph 400 of gain regions of an optical amplification system, in accordance with at least one embodiment of the present disclosure. In some embodiments, the graph 400 may include a wavelength axis 402, a gain axis 404, a first gain region 410, a second gain region 412, a third gain region 414, a fourth gain region 416, a C-band EDFA gain profile (hereinafter C-EDFA) 420, and an L-band EDFA gain profile (hereinafter L-EDFA) 422.

In some embodiments, the wavelength axis 402 may illustrate the wavelength, in nanometers (nm), of an optical signal that may experience amplification in an optical system that includes the graph 400 gain profile. In conjunction with the gain axis 404, the graph 400 may illustrate a potential gain, in decibels (dB), for an optical signal with a given wavelength. In some embodiments, the graph 400 includes the same or similar gain features as the graph 300 of FIG. 3. For example, the first gain region 410 and the fourth gain region 416 may be the same or similar as the first gain region 312 and the second gain region 314 of FIG. 3. Further, the illustrated absence of gain between the first gain region 312 and the second gain region 314 of FIG. 3 may be illustrated by a combination of the second gain region 412 and the third gain region 414.

In some embodiments, the first gain region 410 may be associated with amplification of optical signals in the S-band, as described herein. Alternatively or additionally, the second gain region 412 may be associated with amplification of optical signals in the C-band, as described herein. Alternatively or additionally, the third gain region 414 may be associated with amplification of optical signals in the L-band, as described herein. Alternatively or additionally, the fourth gain region 416 may be associated with amplification of optical signals in the U-band, as described herein.

In some embodiments, the graph 400 may illustrate potential optical signal amplification of an optical amplification system, such as the optical amplification system 200 of FIG. 2. For example, an optical system associated with the graph 400 may include a phosphorus doped optical fiber that may be configured to produce optical signal amplification in the first gain region 410 (e.g., the S-band) and/or the fourth gain region 416 (e.g., the U-band) and one or more EDFAs that may be configured to produce optical signal amplification in the second gain region 412 (e.g., the C-band) and/or the third gain region 414 (e.g., the L-band).

In some embodiments, an optical amplification system including a phosphorus doped optical amplifier, such as the optical amplification system 100 of FIG. 1, may be configured to produce the amplification illustrated as the solid line in the graph 400, including amplification in the first gain region 410 and amplification in the fourth gain region 416. In instances in which one or more EDFAs are included in an optical amplification system having a phosphorus doped optical amplifier, such as the optical amplification system 200 of FIG. 2, the C-EDFA 420 and the L-EDFA 422 may be included in the amplification, such that amplification of an optical signal may occur in the first gain region 410, the second gain region 412, the third gain region 414, and/or the fourth gain region 416.

Modifications, additions, or omissions may be made to the graph 400 without departing from the scope of the present disclosure. For example, in some embodiments, the graph 400 may include various sizes, scales, or other graphical representations that may not be explicitly illustrated or described.

Figure 5:
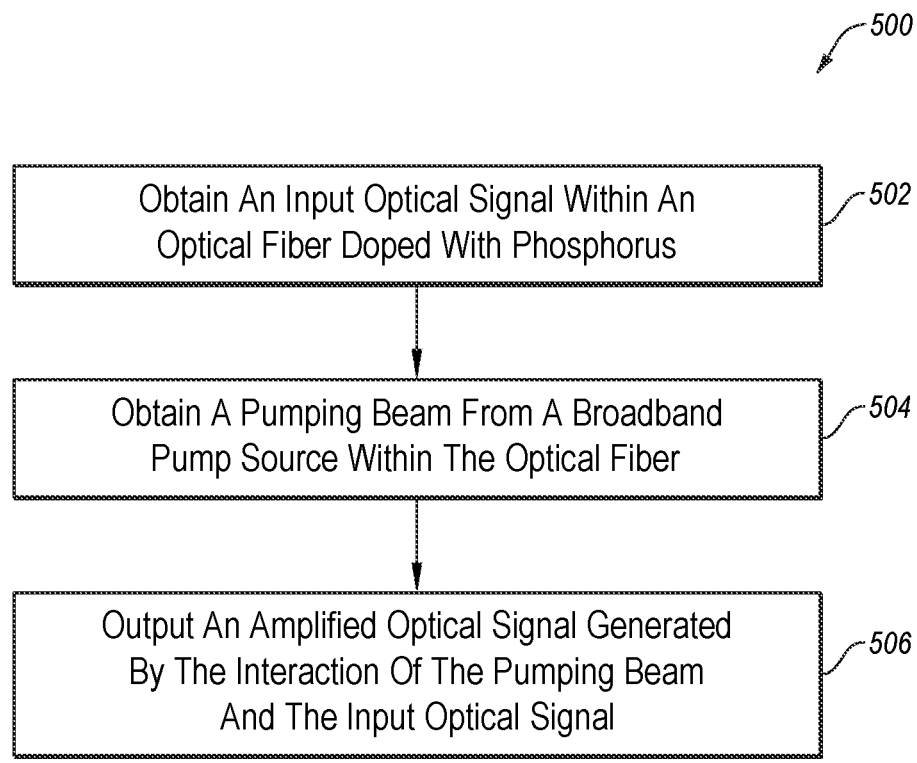
FIG. 5 is a flow chart of an example method of performing optical pumping, all arranged in accordance with some embodiments of the present disclosure.

FIG. 5 is a flow chart of an example method 500 of performing optical pumping, arranged in accordance with at least one embodiment of the present disclosure. The method 500 may be implemented by any suitable element of an optical pumping system such as the optical amplification system 100 of FIG. 1 or the optical amplification system 200 of FIG. 2 as described above. Although illustrated as discrete steps, various steps of the method 500 may be divided into additional steps, combined into fewer steps, or eliminated, depending on the desired implementation. Additionally, the order of performance of the different steps may vary depending on the desired implementation.

In some embodiments, the method 500 may begin at block 502. At block 502, an optical fiber doped with phosphorus may obtain an input optical signal. For example, the input optical signal may be the same or similar as the input optical signal 104 of FIG. 1 and/or the first separated optical signal 212 of FIG. 2. In some embodiments, the input optical signal may include a first wavelength range and a second wavelength range. In some embodiments, the first wavelength range may correspond to the S-band of optical communications and the second wavelength range may correspond to the U-band of optical communications.

At block 504, the optical fiber may obtain a pumping beam from a broadband pump source. In some embodiments, the broadband pump source may be an incoherent pump laser. Alternatively or additionally, the broadband pump source may include a power of at least 20 dBm. In some embodiments, the pumping beam may be configured to produce Raman gain within the optical fiber.

At block 506, the optical fiber may output an amplified optical signal that may be generated by an interaction between the pumping beam and the input optical signal.

Alternatively or additionally, an initial optical signal may be separated into the input optical signal, a first optical signal having a first wavelength range, and a second optical signal having a second wavelength range. The input optical signal, the first optical signal, and the second optical signal may correspond to one or more elements of the optical amplification system 200 of FIG. 2, described herein. For example, the input optical signal may be the same or similar to the first separated signal 212, the first optical signal may be the same or similar to the second separated signal 222, and/or the second optical signal may be the same or similar to the third separated signal 232.

In some embodiments, a first pumping beam having a first pumping wavelength range may be generated. Continuing the previous example, the first pumping beam may be the same or similar to the pumping beam outputted from the second pump source 224 of FIG. 2, which may include a pumping wavelength range of approximately 980 nm or 1480 nm. In some embodiments, the first pumping beam and the first optical signal may be received in a first optical fiber. Continuing the example, the first optical fiber may be the same or similar as the second optical fiber 220 of FIG. 2. In some embodiments, the first optical fiber may be doped with a first element. In some embodiments, the first optical signal may include at least one first wavelength range that may be amplified by the first pumping beam to produce a first amplified optical signal. In some embodiments, the at least one first wavelength range may correspond to L-band optical communications.

In some embodiments, a second pumping beam having a second pumping wavelength range may be generated. Continuing the example, the second pumping beam may be the same or similar to the pumping beam outputted from the third pump source 234 of FIG. 2, which may include a pumping wavelength range of approximately 1480 nm or 980 nm. In some embodiments, the second pumping beam and the second optical signal may be received in a second optical fiber. Continuing the example, the second optical fiber may be the same or similar as the third optical fiber 230 of FIG. 2. In some embodiments, the second optical fiber may be doped with a second element. In some embodiments, the first element and the second element may be the same. For example, the first element and the second element may be erbium. In some embodiments, the second optical signal may include at least one second wavelength range that may be amplified by the second pumping beam to produce a second amplified optical signal. In some embodiments, the at least one second wavelength range may correspond to C-band optical communications.

In these and other embodiments, the amplified optical signal, the first amplified optical signal, and/or the second amplified optical signal may be combined.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An optical amplification system comprising:
   a demultiplexer configured to separate an initial optical signal into a first separated input optical signal, a second separated input optical signal, and a third separated input optical signal, wherein:
   the first separated input optical signal includes a first component that corresponds to a first wavelength range and a second component that corresponds to a fourth wavelength range,
   the second separated input optical signal corresponds to a second wavelength range between the first wavelength range and the fourth wavelength range, and
   the third separated input optical signal corresponds to a third wavelength range between the second wavelength range and the fourth wavelength range;
   a first optical amplifier comprising:
   a first pump source including a broadband laser configured to generate a first pumping beam, the first pumping beam having a first pumping wavelength range of 1330 nanometers (nm) to 1400 nm; and
   a first optical fiber doped with phosphorus configured to receive the first pumping beam and the first separated input optical signal, wherein the first pumping beam and the first optical fiber cause Raman amplification to the first component and the first pumping beam and the first optical fiber are configured to cause Raman amplification to the second component, such that the first component of the first separated input optical signal and the second component of the first separated input optical signal are amplified by the first pumping beam and the first optical fiber to produce a first amplified optical signal that includes the first component as amplified and the second component as amplified;
   a second amplifier comprising:

a second pump source including a first narrowband laser configured to generate a second pumping beam corresponding to a second pumping wavelength range; and a second optical fiber doped with a first element and configured to receive the second pumping beam and the second separated input optical signal, wherein the second pumping beam and the second optical fiber are configured to cause amplification of the second wavelength range to produce a second amplified optical signal out of the second separated input optical signal;

a third amplifier comprising:

a third pump source including a second narrowband laser configured to generate a third pumping beam having a third pumping wavelength range; and a third optical fiber doped with a second element and configured to receive the third pumping beam and the third separated input optical signal, wherein the third pumping beam and the third optical fiber are configured to cause amplification of the third wavelength range to produce a third amplified optical signal out of the third separated input optical signal; and a multiplexer configured to combine the first amplified optical signal, the second amplified optical signal, and the third amplified optical signal.

2. The optical amplification system of claim 1, wherein the broadband laser is an incoherent pump laser.

3. The optical amplification system of claim 1, wherein the first pumping beam of the broadband laser includes a power of at least 20 decibel-milliwatts (dBm).

4. The optical amplification system of claim 1, wherein the first wavelength range corresponds to an S-band of optical communications, the second wavelength range corresponds to a C-band of optical communications, the third wavelength range corresponds to an L-band of optical communications, and the fourth wavelength range corresponds to a U-band of optical communications.

5. The optical amplification system of claim 1, wherein:
the phosphorus of the first optical fiber bonds with oxygen within the first optical fiber to form a single covalent bonded phosphorus compound and a double covalent bonded phosphorus compound;
upon being energized by the first pumping beam, the single covalent bonded phosphorus compound amplifies the first wavelength range of the first component of the first separated input optical signal; and
upon being energized by the first pumping beam, the double covalent bonded phosphorus compound amplifies the second wavelength range of the second component of the first separated input optical signal.

6. The optical amplification system of claim 1, wherein the first element and the second element are the same.

7. The optical amplification system of claim 1, wherein the first element is erbium.

8. The optical amplification system of claim 1, wherein the first second pumping wavelength range includes a wavelength of 980 nm.

9. The optical amplification system of claim 1, wherein the second third pumping wavelength range includes a wavelength of 1480 nm.

10. A method comprising:
separating an initial optical signal into a first separated input optical signal, a second separated input optical signal, and a third separated input optical signal, wherein:
the first separated input optical signal includes a first component that corresponds to a first wavelength range and a second component that corresponds to a fourth wavelength range,
the second separated input optical signal corresponds to a second wavelength range between the first wavelength range and the fourth wavelength range, and
the third separated input optical signal corresponds to a third wavelength range between the second wavelength range and the fourth wavelength range;
generating, using a broadband laser, a first pumping beam having a first pumping wavelength range of 1330 nanometers (nm) to 1400 nm;
receiving, within a first optical fiber doped with phosphorous, the first pumping beam and the first separated input optical signal, wherein the first pumping beam and the first optical fiber cause Raman amplification to the first component and the first pumping beam and the first optical fiber cause Raman amplification to the second component, such that the first component of the first separated input optical signal and the second component of the first separated input optical signal are amplified by the first pumping beam and the first optical fiber to produce a first amplified optical signal that includes the first component as amplified and the second component as amplified;
generating, using a first narrowband laser, a second pumping beam corresponding to a second pumping wavelength range that includes a wavelength of 980 nm;
receiving, by a second optical fiber doped with a first element, the second pumping beam and the second separated input optical signal, wherein the second pumping beam and the second optical fiber cause amplification of the second wavelength range to produce a second amplified optical signal out of the second separated input optical signal;
generating, using a second narrowband laser, a third pumping beam corresponding to a third pumping wavelength range that includes a wavelength of 1480 nm;
receiving, by a third optical fiber doped with a second element, the third pumping beam and the third separated input optical signal, wherein the third pumping beam and the third optical fiber cause amplification of the third wavelength range to produce a third amplified optical signal out of the third separated input optical signal; and
combining the first amplified optical signal, the second amplified optical signal, and the third amplified optical signal.

11. The method of claim 10, wherein the broadband laser is an incoherent pump laser.

12. The method of claim 10, wherein the first pumping beam of the broadband laser includes a power of at least 20 decibel-milliwatts (dBm).

13. The method of claim 10, wherein the first wavelength range corresponds to an S-band of optical communications, the second wavelength range corresponds to a C-band of optical communications, the third wavelength range corresponds to an L-band of optical communications, and the fourth wavelength range corresponds to a U-band of optical communications.

14. The method of claim 10, wherein:
the phosphorus of the first optical fiber bonds with oxygen within the first optical fiber to form a single covalent bonded phosphorus compound and a double covalent bonded phosphorus compound;

upon being energized by the first pumping beam, the single covalent bonded phosphorus compound amplifies the first wavelength range of the first component of the first separated input optical signal; and upon being energized by the first pumping beam, the double covalent bonded phosphorus compound amplifies the second wavelength range of the second component of the first separated input optical signal.

15. The method of claim 10, wherein the first element and the second element are the same.

16. The method of claim 10, wherein the first element is erbium.

\* \* \* \* \*